United States Patent [19]

Whittell, Jr. et al.

[11] 3,992,045
[45] Nov. 16, 1976

[54] MEANS FOR COUPLING AND SEALING MEMBRANE CARRYING TUBE SECTIONS

[75] Inventors: Alfred Whittell, Jr., Los Angeles; Leo Block, Westlake Village, both of Calif.

[73] Assignee: Rev-O-Pak, Inc., Newbury Park, Calif.

[22] Filed: Feb. 3, 1975

[21] Appl. No.: 546,449

[52] U.S. Cl. .......................... 285/371; 210/497 FB; 285/55; 285/383
[51] Int. Cl.² ......................................... B01D 29/10
[58] Field of Search ........... 210/321 R, 433 M, 541; 285/13, 14, 110, 251, 371, 383, 398, 55; 61/12

[56] References Cited
UNITED STATES PATENTS

| 509,458 | 11/1893 | Still | 285/398 |
|---|---|---|---|
| 3,400,825 | 9/1968 | Shippey | 210/321 R |
| 3,408,092 | 10/1968 | Appleton | 285/251 |
| 3,604,728 | 9/1971 | Symcha et al. | 285/14 |
| 3,768,660 | 10/1973 | Block | 210/321 R |
| 3,784,470 | 1/1974 | Richardson et al. | 210/321 R |
| 3,817,387 | 6/1974 | Bachle et al. | 210/321 R |
| 3,851,896 | 12/1974 | Olson | 285/14 |
| 3,934,906 | 1/1976 | Shippey et al. | 285/371 |

FOREIGN PATENTS OR APPLICATIONS

| 711,138 | 6/1965 | Canada | 285/13 |
|---|---|---|---|

*Primary Examiner*—Werner H. Schroeder
*Assistant Examiner*—Conrad L. Berman
*Attorney, Agent, or Firm*—Herzig & Walsh Inc.

[57] ABSTRACT

Porous, tubular core sections coated with a semipermeable membrane are joined at their ends by a simplified coupling member. Each coupling member or connector comprises a cylindrical flange member having helically ribbed or barbed nipples which fit tightly into the ends of bores of adjacent core sections. The ends of the cores abut against the circular part of the coupling member. The ribs on the nipples on the coupling member are resilient and deform when inserted. The nipples have neck parts of a smaller diameter adjacent the body part of the coupling member providing annular spaces between these neck parts and the bores of core members permitting continuous flow of permeate and cleaning solution into these spaces and helically along the nipples. There are no appendages, cavities or pockets in which permeate or cleaning solution could be trapped.

9 Claims, 4 Drawing Figures

U.S. Patent  Nov. 16, 1976  3,992,045
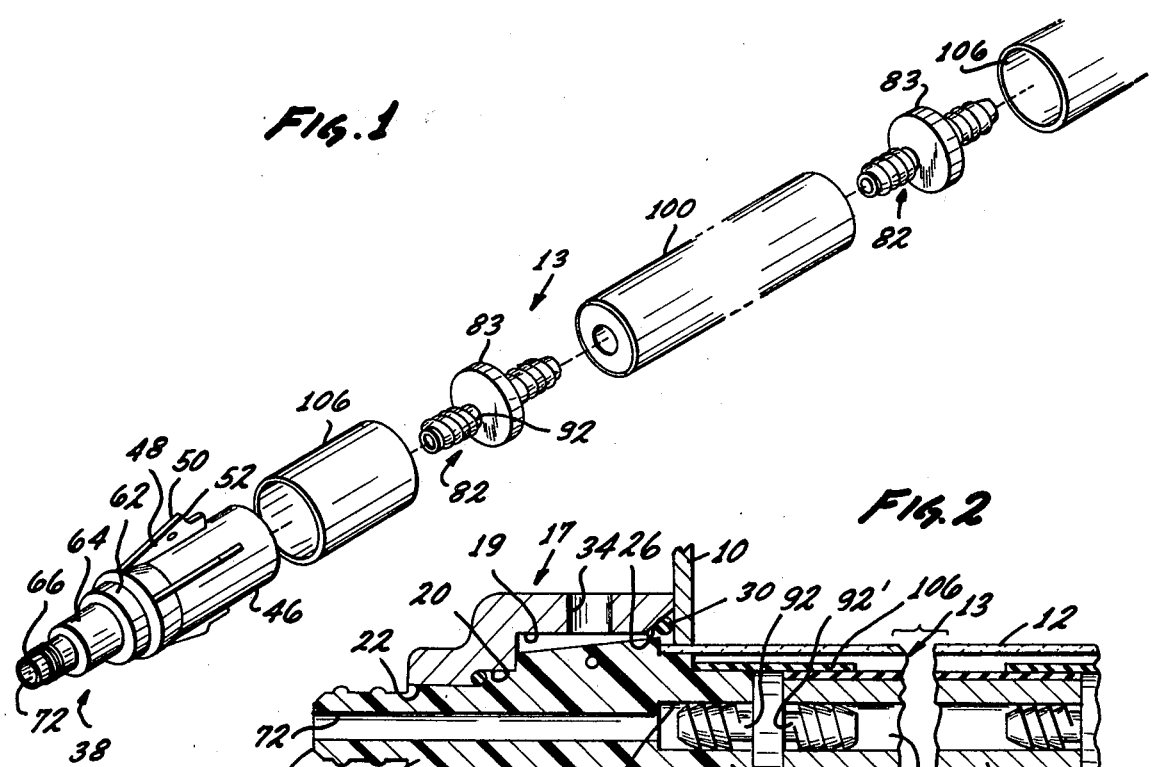
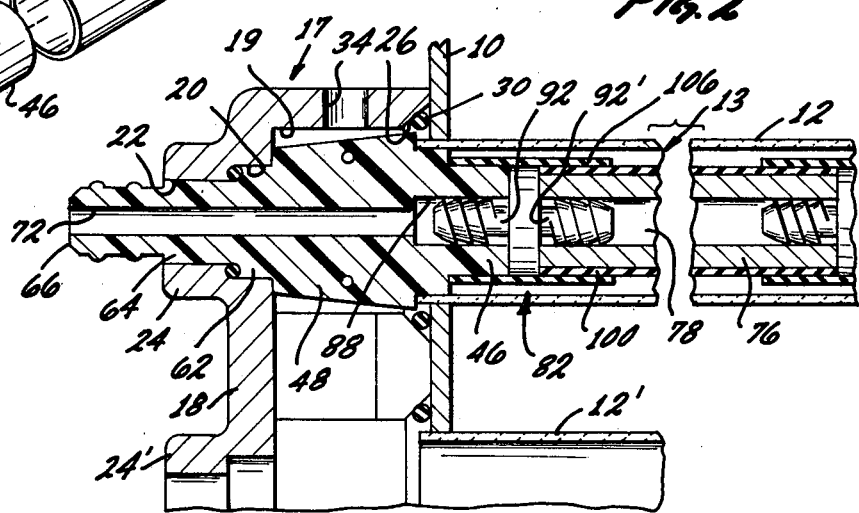
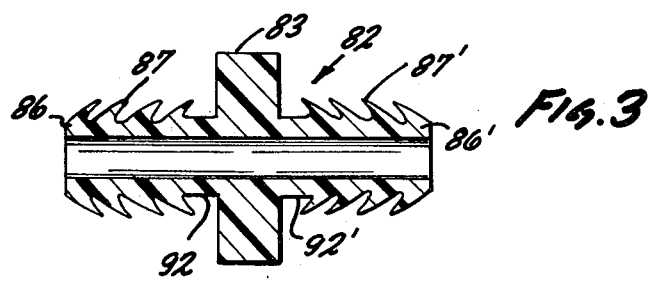
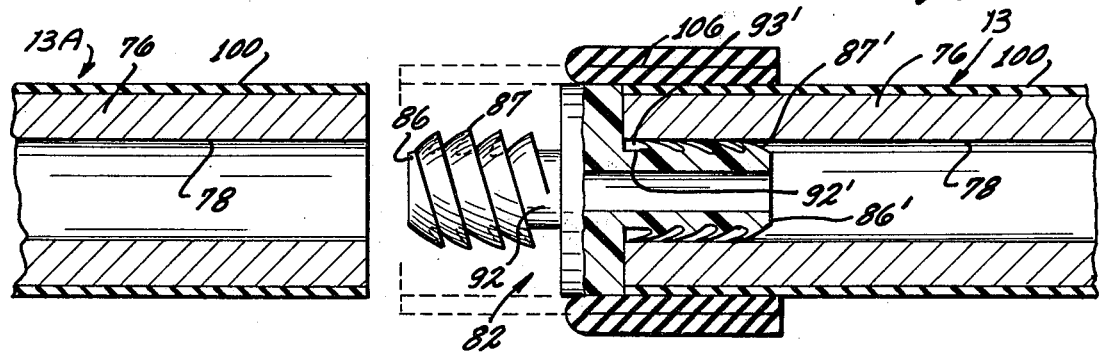

MEANS FOR COUPLING AND SEALING MEMBRANE CARRYING TUBE SECTIONS

SUMMARY OF THE INVENTION

The invention relates primarily to the construction of joints or the joining of ends of porous tubular core members having semipermeable membranes on the surface thereof. The invention is adaptable to many types of apparatus wherein separating membranes are utilized for separation of materials from a fluid. It has adaptability to membrane separation cells of reverse osmosis machines and the exemplary form of the invention as described in detail herein is embodied in that type of machine. The invention is adaptable in membrane separation apparatus where other fluids are involved, such as food processes, etc.

BACKGROUND OF THE INVENTION

One type of membrane separation cell or module utilizing a porous core member carrying a membrane is shown in U.S. Pat. No. 3,400,825. A generally similar type of cell constructed of core sections joined together is shown in U.S. Pat. No. 3,768,660. In this patent, end fittings are employed in the ends of core sections. These fittings are joinable by way of bayonet slot type joints. Other prior art includes U.S. Pat. Nos. 228,161; 1,996,855; 3,784,479; German Pat. No. 919,620 and Italian Pat. No. 516,989.

The herein invention resides primarily in improvements in means for joining and sealing core sections coated with membrane. Improved, simplified connectors or coupling members are provided for joining the core sections with improved sealing means, including an elastomeric sleeve which fits over the joint between the connector and the ends of the core sections.

A primary feature of the improved connecting or coupling means as described in detail hereinafter is the elimination of appendages or pockets in which fluid might be trapped. This feature provides a significant capability by way of a "clean in place" (CIP) feature. This capability is mandatory and imperatively required by the Federal Food and Drug Administration on all food and drug processing equipment for processing substances which are to be used for human consumption.

In the light of the foregoing brief references to the invention, a primary object of the invention is to realize an improved, simplified joining capability and sealing capabilities in the connecting or joining of membrane-carrying porous core sections.

A further object is to realize simplified connecting and disconnecting capability with respect to such core sections.

A futher object is to provide a simplified and improved means of uncoupling joints.

A further object is to realize in a simplified form a "clean in place" (CIP) capability or characteristic in the cell made of connected membrane-carrying core sections.

A further object is to provide an improved connector means of a special configuration whereby the CIP capability is realized, embodying a nipple having a resilient helical rib adapted to frictionally engage in the bore of a core and having the capability of allowing fluid flow along the helical groove in the nipple inside the bore.

BRIEF DESCRIPTION OF THE DRAWINGS

Further objects and additional advantages of the invention will become apparent from the following detailed description and annexed drawings, wherein:

FIG. 1 is a partial isometric exploded view of a single cell of a membrane separation machine, such as a reverse osmosis machine having multiple cells;

FIG. 2 is a partial cross sectional view of the cell and header and part of a U-bend tube;

FIG. 3 is a cross-sectional view of the improved connector.

FIG. 4 is a cross-sectional view of the improved connector or coupling and sealing between cell core sections;

DESCRIPTION OF THE PREFERRED EMBODIMENT

As stated, the invention may be embodied in various types of membrane separation cells wherein materials are separated by passage through a membrane. The herein invention in its exemplary form is illustrated as embodied in a reverse osmosis machine having multiple cells, each of which embodies membrane bearing cores which are coupled and sealed together. U.S. Pat. No. 3,400,825 shows a basic type of cell for a reverse osmosis machine. U.S. Pat. No. 3,768,660 shows a reverse osmosis machine having cells made up of core sections coupled together. It is hereby incorporated herein by reference.

FIGS. 1 and 2 of the drawings show part of a single cell and part of a U-bend tube and a header of a reverse osmosis machine of a type shown in U.S. Pat. No. 3,768,660. Numeral 10 designates a tube sheet which receives the end of U-bend 12 in which is positioned one of the membrane carrying cells designated generally at 13. Numeral 17 designates a header having mounting lugs whereby it can be attached to tube sheet 10 by suitable means. It has a body part 18 having a counterbore 19, a smaller counterbore 20, and an end bore 22. Bore 22 has in an extending end boss 24 of smaller diameter. Body part 18 has an additional similar portion having boss 24' and which receives the end of another U-bend tube 12' as in U.S. Pat. No. 3,768,660 which is hereby incorporated herein by reference.

Bore 19 is bevelled at its end as shown at 26 to accomodate O-ring 30 which seals it to tube sheet 10. Header 17 may have an inlet opening that is designated at 34.

In a typical machine of the type referred to, U-bend tubes 12 are connected by headers of the type described in a complete array, as in the prior patents referred to.

Membrane separation cell 13 is cylindrical and has a plastic end fitting 38. The configuration of fitting 38 can readily be seen in FIG. 1. It has a cylindrical part 46 having equally angularly spaced ribs 48, the outside surfaces of which have a taper as shown at 50. The end part of each rib is cut away, forming a square shoulder 52. At the left end of fitting 38, there are portions 62, 64 and 66 of progressively smaller diameter. FIG. 2 illustrates the manner in which fitting 38 fits into header casting 17. End part 62 of fiting 38 is in counterbore 20 and abuts against O-ring 63. Part 64 fits into bore 22. Part 66 is a ribbed nipple that extends exteriorly of casting 17. Fitting 38 has a cylindrical bore 72. Its right ends extends through tube sheet 10, and it is coupled to the core section as will be described, ribs 48 abutting the end of tube 12.

Membrane separation cell 13 is formed in modular sections as may be seen. Each one of the sections in the form of the invention shown comprises a cylindrical porous core member which may be made of ceramic designated at 76. The porous core member has a bore 78. Numeral 13A designates another similar modular core member. See FIG. 4.

Numeral 82 designates one of the core connectors or couplers. Preferably, the couplers are made of plastic and have a configuration as illustrated in the drawings. Each coupler has a cylindrical flange-like body part 83 from which extend in opposite directions nipples as designated at 86 and 86'. The nipples have a helical rib or barb as designated at 87 and 87'. The ribs have resiliency. Between the barb parts of the nipples and central part 83 are intermediate parts 92 and 92' which are of smaller diameter than bore 78 of a core section. Thus, there is an annular space 93' between part 92' of coupler 82 and bore 78 of a core section and a similar annular space on the other side of body part 83. The ribbed end surfaces of nipples 86 and 86', permits deflection or deformation of the helical ribs when the nipples are inserted into the bores of the cores, thus accommodating for a variance in core/bore diameter. This is illustrated in FIG. 4.

Core sections are coated or covered by separating membrane 100 which may be of a type referred to in the previous patents.

Numeral 106 designates a sleeve made of elastomeric material. Sleeve 106 occupies a position as illustrated in FIGS. 1, 2 and 4. As may be seen, the ends of core sections 76 and 76' are joined by connector or coupler 82 with a cylindrical body part 83 positioned between the ends of the core sections which abut against the cylindrical sections. Sleeve 106 which is flexible, bridges the joint between core sections.

FIGS. 2 and 4 illustrate how core sections are joined together by the connectors or couplings into elongated cells or modules which are then assembled into U-bend tubes 12 as illustrated in FIG. 2. End fitting 38 at one end of the module fits into header 17 as described. As may be seen, end fitting 38 fits into the end of tube 12. It has an extending part 46 having an outside diameter corresponding to the outside diameter of core section 76 with its membrane 100. End fitting 38 has a bore 72 with a counterbore 88 at the end of a size to receive one of the nipples 86 of connector 82.

It will be understood that in the exemplary form of the invention, illustratively, a reverse osmosis machine concentrate is on the outside of the cores bearing the membranes and permeate is in the bores in the core sections and is taken off through the nipples as illustrated at 66.

One of the unique capabilities of the invention is that ease of coupling and uncoupling is realized, the core sections themselves being difficult to handle in long lengths. The helical ribs on nipples 86 and 86' do not damage the bores of core sections when coupling or uncoupling.

For purposes of uncoupling, the sleeve material which is a material that retains its elasticity during extended operating periods is folded back on itself as illustrated in FIG. 4. In normal position shown in FIG. 2 and 4, the sleeve covers the parts of the cores coated with membrane 100. When the sleeve is folded back as may be observed, uncoupling may be effected merely by withdrawing nipples from their respective bores. Sleeve 106 when in place acts as a seal, preventing the concentrate from entering the interior of the cores except by way of permeation through membrane 100.

The helical ribs hold in the bores of the cores by friction, the ribs deforming as shown. For uncoupling the helically ribbed nipples can simply be twisted out, that is, unthreaded from the bores.

A particular unique, capability of the invention is that of being able to realize a "clean in place" (CIP) feature, which is imperatively necessary for processing any substances which are to be used for human consumption. Such a feature is required and specified in respect of all food and durg processing equipment by the Federal Food and Drug Administration and all dairy associations. The cleaning process consists of circulating a cleaning and disinfecting solution through the equipment, in this exemplary case, the reverse osmosis unit, to remove any deposits and destroy any bacteria. In order to obtain CIP approval, it is necessary that the cleaning solution come in contact with all surfaces which constitute the flow path or paths and therefore it is imperative that there be no appendages to the main flow. As herein used, appendages means blind passageways, that is, passages closed at one end, not permitting a continuous flow therethrough, pockets or cavities, likewise capable of permitting an accumulation of liquid without a continuous flow. The structure and technique as described herein eliminates such appendages, pockets, or cavities, and has the capability of readily making possible CIP approval of the machine.

FIG. 4 is illustrative of a flow of cleaning solution or fluid. As may be seen, it passes through membrane 100 and porous core member 76 and can pass into annular space 93' which is in communication with the groove of rib 87' so that solution can flow along the groove so that all parts are exposed to it and by way of continuous flow without trapping of solution in appendages or cavities.

From the foregoing, those skilled in the art will readily understand the nature and construction of the invention and the manner which it realizes and achieves all of the objects as set forth in the foregoing.

The foregoing disclosure is representative of preferred forms of the invention and is to be interpreted in an illustrative rather than a limiting sense, the invention to be accorded the full scope of the claims appended hereto.

What is claimed is:

1. Coupling means for making a coupling, a tubular porous core member having an axial bore and having a separating membrane coating the surface thereof, the coupling means comprising a connector member having a nipple part adapted for securement in the end of the bore of the core member, the connector having an axial bore therethrough, the nipple having an helical rib configurated to provide securement in the bore of the core section and there being a helical groove between rib convolutions inside the bore, whereby cleaning fluid can permeate through a core into the helical groove and can then travel axially to the end of the nipple.

2. Coupling means as in claim 1, wherein said nipple is configurated to have a tight sealing but removable friction fit in the end of the bore of the adjacent core section.

3. Coupling means as in claim 1 including an elastomeric sealing sleeve member positioned to bridge over a joint between the connector member and an adjacent end of a core member.

4. Coupling means as in claim 3, wherein said sleeve member is sufficiently flexible to allow it to be folded back axially whereby to allow the connector member to be uncoupled or unjointed from the ends of adjacent core sections.

5. A coupling means as in claim 1 a further porous tubular core member having an axial bore and having a separating membrane coating the surface thereof, the coupling means having a body part configurated to fit between adjacent ends of core members, the connector member having a second similar nipple extending oppositely from the said first nipple adapted for securement in the ends of the bores of adjacent core members, said nipples being configurated to seal the joints between the connector member and adjacent ends of core members.

6. Coupling means as in claim 5, wherein each of the nipples has a neck part of smaller diameter adjacent to the body part so as to provide an annular space between the neck part and the bore of the core section, whereby to allow continuous flow of cleaning fluid passing through the porous core section into said annular spaces and along the helical grooves to the ends of the nipples.

7. Coupling means as in claim 6, including an elastomeric sealing sleeve member positioned to bridge over joints between a connector member and adjacent ends of core members.

8. Coupling means as in claim 5, wherein said body part is in the form of a cylindrical flange having flat surfaces against which the ends of adjacent core sections abut.

9. Coupling means for making a coupling, the coupling being adapted for coupling tubular porous core sections each having an axial bore and each having a separating membrane coating the surface thereof, the coupling means comprising a connecter member having a nipple part adapted for securement in the end of the bore of a core section, the connector having an axial bore therethrough, the nipple having an helical rib configurated to provide securement in the bore of the core section and there being an helical groove between rib convolutions inside the bore, whereby cleaning fluid can permeate through a core into the helical groove and can then travel axially to the end of the nipple.

* * * * *